United States Patent Office 3,023,231
Patented Feb. 27, 1962

3,023,231
PRODUCTION OF CALCIUM PETROLEUM
SULFONATES
Richard S. Logan, Bartlesville, Okla., assignor to Phillips Petroleum Company, a corporation of Delaware
No Drawing. Filed Nov. 28, 1958, Ser. No. 776,753
7 Claims. (Cl. 260—504)

This invention relates to the production of calcium petroleum sulfonates. In another aspect, it relates to the separation of calcium petroleum sulfonates from lime-neutralized sulfonation mixtures, for example by filtration, these sulfonates having particular utility as additives for lubricating oils.

Combustion chamber deposit formation in automobile engines has become a critical problem in recent years with the introduction of higher compression ratio engines. Commercial calcium petroleum sulfonates have found widespread use in lubricating oil as additives designed to reduce or eliminate these combustion chamber deposits. These sulfonates are desirably prepared by sulfonating a lubricating oil and neutralizing the resulting sulfonic acids with lime in order to form calcium petroleum sulfonates and stabilize the sulfonic acid mixture with respect to ferrous corrosion. The resulting neutralized mixture, which contains solids such as calcium sulfate dihydrate, is then separated to obtain the calcium petroleum sulfonates, the separation generally being carried out by filtration of the neutralized mixture. The separation of the lime-neutralized sulfonation mixture, especially by filtration, is the primary concern of this invention.

Accordingly, an object of this invention is to provide an improved method of preparing lime-neutralized sulfonation mixtures in a manner designed to improve the separation of calcium petroleum sulfonates therefrom. Another object is to provide an improved method of stabilizing lime-neutralized sulfonation mixtures with respect to ferrous corrosion. Another object is to improve the filtration rate of lime-neutralized sulfonation mixtures. Another object is to improve the separation of calcium petroleum sulfonates from a neutralized sulfonation mixture, the latter in addition containing solids such as calcium sulfate dihydrate. Another object is to treat a lime-neutralized sulfonation mixture in such a manner as to enable it to pass an acid vapor test, hereinafter defined, without impeding the subsequent separation of the calcium petroleum sulfonates therefrom. A further object is to stabilize and dehydrate a lime-neutralized sulfonation mixture under such conditions of temperature and pressure as to prevent the dehydration of calcium sulfate dihydrate, and thereby improve subsequent separation of the calcium petroleum sulfonates. Other objects and advantages of this invention will become apparent to those skilled in the art from the following discussion and appended claims.

Briefly, I have found that the separation of calcium petroleum sulfonates from a lime-neutralized sulfonation mixture containing solids such as calcium sulfate dihydrate can be improved by treating the mixture in such a manner and under such conditions as to prevent the dehydration of calcium sulfate dihydrate. The lime-neutralized sulfonation mixture is heated under certain conditions so as to stabilize it with respect to ferrous corrosion, and then dehydrated under certain conditions so as to remove water therefrom, in order to improve the subsequent separation of calcium petroleum sulfonates from the neutralized mixture, for example by filtration. The treating and dehydrating conditions are such as to prevent the dehydration of calcium sulfate dihydrate to the hemi-hydrate.

The lubricating oil, from which the calcium petroleum sulfonates are prepared, can be any lubricating oil blending stock having a viscosity in the range between about 38 and 700 SUS at 210° F., preferably a dewaxed blending stock having a viscosity in the range between about 38 and 300 SUS at 210° F. An especially preferred lubricating oil blending stock is a propane fractionated, solvent-extracted Mid-Continent oil having a viscosity of about 200 to 230 SUS at 210° F., and a viscosity index between about 80 and 100 or higher, this stock being hereinafter referred to as a 250 stock. Another especially preferred lubricating oil blending stock is a distilled, phenol-extracted, dewaxed, light neutral Mid-Continent oil of about 50 to 60 SUS at 210° F., more specifically about 54 SUS at 210° F., with a viscosity index between about 85 and 105, more specifically about 100, this preferred stock being hereinafter referred to as a 20 stock. Neutral oils of SAE 10, 20, or 50 viscosity grades can also be sulfonated. The aforementioned 250 stock is preferred in the practice of this invention since the sulfonation of this stock does not result in the production of an acid sludge, this latter material generally being regarded as a waste product.

The lubricating oil blending stocks can be sulfonated by any conventional sulfonation procedure, though liquid phase sulfonation is preferred. The blending stocks can be sulfonated with any sulfonating agent in the art, including fuming sulfuric acid, chlorosulfonic acid, sulfur trioxide, and liquid sulfur trioxide (such as that sold as Sulfan-B) in liquid sulfur dioxide diluent. The latter sulfonating agent is preferred because its use results in the essential absence of any unreacted acid in the sulfonation mixture, the weight percent of the sulfur trioxide in the sulfur dioxide being preferably about 10. The sulfonating agent/oil ratio, more generally termed an acid/oil ratio (or in the case where sulfur trioxide is used, the $SO_3$/oil ratio) can vary over a wide range and will be dependent upon the sulfonation temperature; generally the acid/oil ratio will vary between 1 and 0.02, more preferably about 0.08.

The sulfonation temperature is usually controlled within the range of about 50 to 200° F., with the preferred operating range being between 80 and 165° F., an even more preferable temperature being between about 100 and 110° F. Somewhat lower temperatures can be employed without seriously slowing the reaction rate, but no particular advantage results from operating in this manner and it is advantageous to sulfonate at the elevated temperatures in order to reduce the time required for the sulfonation step, a preferred reaction time being about 10 minutes. At temperatures of about 200° F., excessive oxidation with the liberation of $SO_2$ takes place. The sulfonation reaction is preferably carried out at a pressure of about 110 p.s.i.g. in a closed vessel, although greater or lesser pressures can be employed if desired, including atmospheric pressure.

Sulfonation is preferably carried out in a centrifugal mixer into which the oil and sulfonating agent are injected and the resulting mixture agitated under sufficient pressure to maintain the liquid phase.

Following the sulfonation reaction, the resulting sulfonation mixture of sulfonic acids can be flashed to atmospheric pressure to remove the bulk of free $SO_2$.

The resulting complex mixture of petroleum sulfonic acids (comprising in addition to the sulfonic acids, unreacted oil and "excess" acids) is then neutralized with lime, preferably by running the sulfonic acids into a neutralizing drum containing a slurry of hydrated lime, $Ca(OH)_2$, water, and a suitable hydrocarbon diluent, such as Stoddard Solvent, or any other hydrocarbon diluent that is non-sulfonatable (e.g., petroleum naphtha, kerosene, cyclohexane, light alkylate fractions, etc.), the neutralizing temperature being allowed to seek its own level and sufficient pressure used to maintain the liquid phase. Alternatively, the sulfonic acids can be mixed with said hydrocarbon diluent and then admixed with a slurry of hydrated lime and water. Alternatively, instead of using hydrated lime, CaO can be added to the sulfonic acids and resulting mixture then being further admixed with water and diluent. As used in this application, the term "lime" generically means CaO or $Ca(OH)_2$, unless otherwise specified. A suitable commercially available hydrated lime which can be used is Kemilime. In neutralizing the sulfonic acids, an excess of lime is used, the excess generally being about 15 to 100 weight percent, preferably about 40 weight percent. The quantity of lime used in practice will depend on its purity and particle size. In making up the lime slurry, a minimum amount of water is used, the water/hydrocarbon weight ratio (where the hydrocarbon is determined as the total solvent and oil) preferably being a minimum of about 0.10. The lime-neutralizing step results in the formation of calcium petroleum sulfonates and the neutralization of any excess acid present in the sulfonation mixture. A suitable lime slurry composition which can be used per each 100 pounds of lubricating oil blending stock is as follows:

|  | Lbs. |
|---|---|
| Water | 48 |
| Kemilime | 9.5 |
| Stoddard Solvent | 54 |

The foregoing described procedure of sulfonation and neutralization is known in the art and need not be further described.

Although the lime-neutralized sulfonation mixture will give an alkaline reaction when tested with phenolphthalein, it generally is not completely non-corrosive to engine cylinder walls and piston rings. Accordingly, the lime-neutralized mixture must be heated so as to stabilize it with respect to ferrous corrosion. In stabilizing the lime-neutralized sulfonation mixture, I have found that this step should not be carried at high temperatures sufficient to dehydrate calcium sulfate dihydrate to the hemi-hydrate, and thereby impede the subsequent separation step, e.g., by causing very slow filter rates. Accordingly, the lime-neutralized sulfonation mixture is stabilized by heating it in a closed vessel under sufficient pressure to maintain the liquid phase, so as to prevent the evaporation of water, especially water of hydration. The temperature employed in this stabilizing step will generally be in the range of about 280 to 360° F. Lower temperatures, e.g. down to 240° F., or lower, can be used but no advantage is gained since the treating step takes too long at this lower temperature. Higher temperatures, up to about 450° F., can also be used providing sufficient pressure is maintained to prevent the dehydration of calcium sulfate dihydrate. A pressure of about 110 p.s.i.g. will generally be sufficient when operating at about 200° F. The duration of this treating step can vary generally between about 5 and 40 minutes, but it can either be shorter or longer than this time, a preferred residence time being about 10 to 14 minutes. Stating these conditions in functional terms, sufficient pressure is employed to maintain the liquid phase and a sufficiently high temperature employed to stabilize the lime-neutralized sulfonation mixture with respect to ferrous corrosion, yet under conditions of pressure and temperature sufficient to prevent the dehydration of calcium sulfate dihydrate. Following this stabilizing step, it is desirable according to the practice of this invention to cool the treated sulfonation mixture before reducing the pressure to atmospheric. If the sulfonation mixture is not cooled in this manner, the return of the pressure to atmospheric tends to dehydrate to some degree the calcium sulfate dihydrate. Generally, the sulfonation is cooled to a temperature below 210° F. before reducing the pressure to atmospheric.

Following the latter mentioned cooling step and the return to atmospheric pressure, the treated lime-neutralized sulfonation mixture can then be tested for ferrous corrosion properties. If a small sample of the sulfonation mixture does not turn blue litmus paper red when heated to about 500° F., the sulfonation product is considered non-corrosive. This simple test is referred to as the "acid vapor test."

Since the presence of water in the lime-neutralized sulfonation mixture hampers the subsequent separation of the calcium petroleum sulfonates therefrom, e.g., by causing very slow filter rates, the sulfonation mixture is dehydrated. In this dehydration step, the water is substantially all removed (along with the hydrocarbon diluent used in the neutralization step). It is desirable to reduce the water content to less than 0.4 weight percent, but satisfactory separation can be subsequently carried out if the water is reduced to only 1 percent or a little higher. I have discovered that in carrying out this dehydration step, the conditions must be such as to prevent dehydration of calcium sulfate dihydrate. This dehydration step is preferably accomplished by vacuum flashing, or any other suitable method, for example, by azeotroping the water with benzene.

The dehydration of the lime-neutralized sulfonation mixture can be accomplished in a continuous flash vaporization step operated at a temperature between about 50 and 200° F., preferably between 140 and 170° F., and at a pressure of about 0.2 to 28 inches Hg absolute, or, stated functionally, dehydrating the sulfonation mixture under conditions of temperature and pressure sufficient to remove substantially all of the water and yet prevent the dehydration of the calcium sulfate dihydrate.

Following the dehydration step, the pressure is reduced to atmospheric to lessen the likelihood that the dihydrate will dehydrate, or to lessen the rate of dehydration of the dihydrate. Alternatively, the flashed vacuum bottoms can be cooled to a suitable temperature below about 160° F.

The dehydrated sulfonation mixture contains solids such as calcium sulfate and unreacted lime and these solids must be separated from the calcium petroleum sulfonates, the latter being dissolved in the unreacted oil and hydrocarbon solvent. This separation of the calcium petroleum sulfonates can be accomplished by any suitable method, for example by simple settling and decanting, centrifugation, or more preferably by filtration. Where separation is accomplished by filtration, it is generally preferred to have the filter feed at a temperature of about 160° F., with a filter drum vacuum of about 16 inches Hg. To facilitate this latter type of separation of the solids, finely divided diatomaceous earth is added to the dehydrated sulfonation mixture, preferably along with a suitable amount of an inert hydrocarbon diluent, such as Stoddard Solvent, a suitable solvent/vacuum bottoms volume ratio being about 2. A diatomaceous earth found particularly suitable for this purpose is that sold as Filter-Cel, the use of this product giving a filtrate of satisfactory clarity with less than 0.1 weight percent solids (on solvent free filtrate).

Where the separation of the calcium petroleum sulfonates is effected by filtration on a filter cloth, such as a cotton cloth, it is desirable to precoat the filter cloth with a sufficient layer e.g., one inch thick, of a precoating material, preferably the aforementioned diatomaceous earth.

I have found that by insuring the presence of calcium sulfate in the lime-neutralized sulfonation mixture as the dihydrate, the separation of the calcium petroleum sulfonates is greatly facilitated and improved. Where filtration is employed to effect this separation, I have substantially reduced the time consumed in filtering the sulfonation mixture. The filtration rate has been increased from about 1 gallon per hour per square foot to about 2 to 2.5 gallons per hour per square foot, on a comparable solvent dilution basis. Better washing of the filter cake also results with increased recovery of calcium petroleum sulfonates.

Following filtration, the calcium petroleum sulfonates can be recovered from the solids-free filtrate by any suitable method known in the art, for example by propane fractionation, flashing, distillation, stripping, etc.

The following examples are set forth to further illustrate the objects and advantages of this invention. It should be understood that the examples demonstrating this invention are merely set forth for illustrative purposes and the temperatures, pressures, amounts of materials, etc., represent preferred embodiments of this invention and should not be construed to unduly limit the same. In these examples, runs were carried out under conditions other than those of this invention for purposes of comparison and to point out the novelty of this invention.

EXAMPLES

A number of sulfonation and neutralization runs were made in a pilot plant wherein the aforementioned 250 stock (a propane fractionated, solvent refined Mid-Continent lubricating oil blending stock having a viscosity of about 200 to 230 SUS at 210° F.) was sulfonated with liquid sulfur trioxide in liquid sulfur dioxide, and the sulfonic acids then neutralized with a lime slurry. The sulfonating and neutralizing conditions for these runs are set forth in Table I.

Samples of each of the lime-neutralized sulfonation mixtures prepared in the above-described pilot plant runs were then treated in the following manner. The lime-neutralized samples were heated in a pilot plant treater, under sufficient pressure to maintain the liquid phase, so as to stabilize the same with respect to ferrous corrosion (as established by the acid vapor test), then certain of these samples dehydrated and filtered in the laboratory. Conditions of treatment and filtration results are set forth in Table II.

Table II

| Lime-neutralized samples | Pilot plant source of samples, run | Stabilizing treating conditions | | Temp of stabilized sample before reducing press. to 1 ATM., °F. | Acid vapor test of stabilized samples | Dehydrating conditions | | | Filtration time to collect 40 ml. filtrate, min. |
|---|---|---|---|---|---|---|---|---|---|
| | | Residence, min. | Temp., °F | | | Temp., °F. | Vacuum, in. Hg | Residence, min. | |
| 1 | 1 | 12 | 366 | 366 | Pass | (¹) | (¹) | (¹) | >16 |
| 2 | 2 | 12 | 366 | 366 | | 180 | 28 | 40 | >15 |
| 3 | 3 | 13 | 264 | 280 | Pass | 180 | 28 | 40 | >16 |
| 4 | 5 | 14 | 280 | 233 | | (²) | (²) | (²) | 5.3 |
| 5 | 5 | 14 | 280 | 233 | Pass | 180 | 26.5 | 35 | 2.2 |
| 6 | 5 | 14 | 280 | 170 | | (²) | (²) | (²) | 10.0 |
| 7 | 5 | 14 | 280 | 170 | Pass | 160 | 26 | 55 | 0.6 |
| 8 | 5 | 36 | 280 | 130 | do | 155 | 26 | 70 | 0.7 |
| 9 | 5 | 6.5 | 280 | 206 | Fail | 145 | 26 | 60 | 1.2 |
| 10 | 3 | 13 | 240 | 240 | do | 180 | 28 | 40 | 1.75 |

¹ Sample not dehydrated. Stabilizing treating conditions reduced water content of sample to <0.4% and further dehydration was not necessary.
² Sample not dehydrated. Filter feed comprised 13 weight percent water.

As shown in Table II, the filtration of lime-neutralized samples 1 and 2 was excessively slow, this being attributed to the high stabilizing treating temperatures and/or failure to reduce the temperature prior to reducing the pressure to atmospheric, which conditions favor the dehydration of the calcium sulfated dihydrate. The excessively slow filtration rate of sample 3 is also attributed to the failure to cool the stabilized sample prior to reducing the pressure to atmospheric. A comparison of the filtration rates of samples 4 and 5 and samples 6, 7, and 8 respectively, shows the desirability of dehydrating the stabilized samples prior to filtration, according to this invention. Although the filtration rate of sample 9 was satisfactory, its failure to pass the acid vapor test could be overcome by prolonging the duration of the stabilizing step, i.e., longer than 6.5 minutes (for example, 14 minutes) which value represents the minimum duration for this sample. Similarly, although the filtration rate of sample 10 was satisfactory, its failure to pass the acid vapor test could be overcome by increasing the stabilizing treating temperature, i.e., higher than 240° F. (for example, 280° F.) which value represents the minimum temperature for this sample.

A number of other lime-neutralized sulfonation samples were stabilized by heating the same under sufficient pressure to maintain the liquid phase, then, in pilot plant equipment, dehydrated in a vacuum flash unit and filtered. These conditions and results are set forth in Table III.

Table I

| Run No. | Acid feed, weight percent SO₃ | SO₃/oil, weight ratio | Sulfonation conditions | | | Lime slurry composition | | | |
|---|---|---|---|---|---|---|---|---|---|
| | | | Temp., °F. | Time, min. | Press., p.s.i.g. | Water, weight percent | Kemi-lime, weight percent | Stoddard solvent, weight percent | Excess lime, weight percent |
| 1 | 10 | 0.091 | 92 | 13 | 110 | 81 | 19 | 26.5 | 52.5 |
| 2 | 10 | 0.080 | 110 | 13 | 110 | 83.2 | 16.8 | 26.5 | 69.5 |
| 3 | 10 | 0.078 | 103 | 13 | 110 | 84.0 | 16.0 | 26.5 | 38.0 |
| 4 | 10 | 0.089 | 108 | 13 | 110 | | | | 65.5 |
| 5 | 10 | 0.08 | 96 | 13 | 110 | | | | 45 |

Table III

| Lime-neutralized samples | Pilot plant source of samples, run | Stabilizing treating conditions | | | Temp. of stabilized sample before reducing press. to 1 atm., °F. | Dehydrating conditions | | | | Filtration | |
|---|---|---|---|---|---|---|---|---|---|---|---|
| | | Residence, min. | Temp., °F. | Press. p.s.i.g. | | Feed lime jacket temp., °F. | Flash inlet temp., °F. | Film evaporation leg jacket temp., °F. | Vacuum, in. Hg | Filter feed, weight percent water | Time to collect 40 ml. filtrate, min. |
| 1 | 1 | 8 | 303 | 400 | 301 | 366 | 366 | 366 | 29 | 0 | >16 |
| 2 | 4 | 8 | 285 | 350 | 280 | 190 | 173 | 160 | 28 | 0.33 | 30 |
| 3 | 4 | 8 | 280 | 370 | 280 | 172 | 167 | 160 | 28.5 | 0.34 | 15 |
| 4 | 4 | 8 | 280 | 370 | 280 | 150 | 141 | 140 | 28.9 | 0.22 | 3.7 |
| 5 | 4 | 8 | 280 | 370 | 280 | 140 | 132 | 130 | 28.8 | 0.15 | 1.8 |
| 6 | 4 | 8 | 280 | 370 | 190 | 190 | 175 | 160 | 28.5 | 0.49 | 18 |
| 7 | 5 | 8 | 280 | 225 | 190 | 152 | 147 | 145 | 26.5 | 0.45 | 4 |
| 8 | 5 | 8 | 280 | 225 | 190 | 194 | 187 | 183 | 20.1 | 0.13 | 2.3 |
| 9 | 5 | 8 | 280 | 225 | 190 | 180 | 176 | 172 | 20.1 | 0.40 | 1.2 |

As shown in Table III, dehydration of sample 1 resulted in the complete absence of water in the filter feed, but this in itself did not insure a feed of satisfactory filterability, the dehydrating conditions being such as to cause the dehydration of calcium sulfated dihydrate. The filtration rates of dehydrated samples 2, 3, 4 and 5 progressively improved as a result of progressively lower dehydrating temperatures at substantially constant vacuum, the dehydrating temperature and pressure conditions of samples 2 and 3 being at the threshold of the dehydration of calcium sulfate dihydrate and the dehydrating conditions of samples 4 and 5 being remote from the dehydration of this salt. A comparison of samples 6, 7, 8 and 9 further show the effect of the dehydrating conditions of temperature and pressure on the filterability of the lime-neutralized samples.

Various modifications and alterations of this invention will become apparent to those skilled in the art without departing from the scope and spirit of this invention, and it should be understood that the foregoing discussion and examples merely set forth prefered embodiments of this invention for illustrative purposes and should not be construed to unduly limit this invention.

I claim:

1. A process of improving the separation of calcium petroleum sulfonates from a lime-neutralized petroleum mixture containing calcium sulfate dihydrate, which comprises heating said mixture at a temperature in the range of 240 to 450° F. which maintaining the liquid phase thereof so as to stabilize the same with respect to ferrous corrosion, dehydrating the resulting stabilized mixture at a temperature in the range of 50 to 200° F. and at a pressure in the range of 0.2 to 28 inches Hg absolute, and separating said calcium petroleum sulfonates from the resulting dehydrated mixture, said steps of heating and dehydrating being carried out at temperatures and pressures sufficient to prevent the dehydration of said calcium sulfate dihydrate.

2. The process according to claim 1 wherein said separation step is accomplished by filtering said dehydrated mixture.

3. The process according to claim 2 further comprising adding diatomaceous earth filtering aid material to said dehydrated mixture prior to filtering the same.

4. A process of improving the separation of calcium petroleum sulfonates from a lime-neutralized petroleum sulfonation mixture, which comprises heating said mixture at a temperature in the range of 240 to 450° F. while maintaining the liquid phase thereof so as to stabilize the same with respect to ferrous corrosion, cooling the resulting stabilized mixture prior to reducing the pressure thereon to one atmosphere, vacuum flashing the resulting cooled stabilized mixture at a temperature in the range of 50 to 200° F. and at a pressure in the range of 0.2 to 28 inches Hg absolute so as to dehydrate said stabilized mixture, and filtering the resulting dehydrated mixture so as to separate said calcium petroleum sulfonates therefrom including solids comprising calcium sulfate, said steps of heating and flashing being carried out at temperatures and pressures insufficient to dehydrate calcium sulfate dihydrate, thereby substantially improving the filtration rate of said dehydrated mixture.

5. The process of claim 4 wherein said sulfonation mixture is prepared by sulfonating a lubricating oil blending stock having a viscosity in the range of 38 to 700 SUS at 210° F., with liquid sulfur trioxide in liquid sulfur dioxide.

6. The process according to claim 5 wherein said lubricating oil blending stock has a viscosity in the range of 200 to 230 SUS at 210° F.

7. The process according to claim 5 wherein said filtration step is facilitated by admixing with said dehydrated mixture diatomaceous earth filtering aid material prior to filtering the same.

References Cited in the file of this patent

UNITED STATES PATENTS

| 2,573,796 | Latier et al. | Nov. 6, 1951 |
| 2,738,326 | Anderson et al. | Mar. 13, 1956 |
| 2,843,626 | Gebelein et al. | July 15, 1958 |
| 2,909,563 | Whitney | Oct. 20, 1959 |

FOREIGN PATENTS

| 154,099 | Australia | Nov. 11, 1953 |

UNITED STATES PATENT OFFICE
CERTIFICATE OF CORRECTION

Patent No. 3,023,231 February 27, 1962

Richard S. Logan

It is hereby certified that error appears in the above numbered patent requiring correction and that the said Letters Patent should read as corrected below.

Column 7, line 43, after "petroleum" insert -- sulfonation --; line 46, for "which" read -- while --.

Signed and sealed this 7th day of August 1962.

(SEAL)
Attest:

ERNEST W. SWIDER
Attesting Officer

DAVID L. LADD
Commissioner of Patents